Feb. 5, 1935.  R. WILDERMANN  1,990,314
WELDING REFRACTORY METAL
Filed May 31, 1930
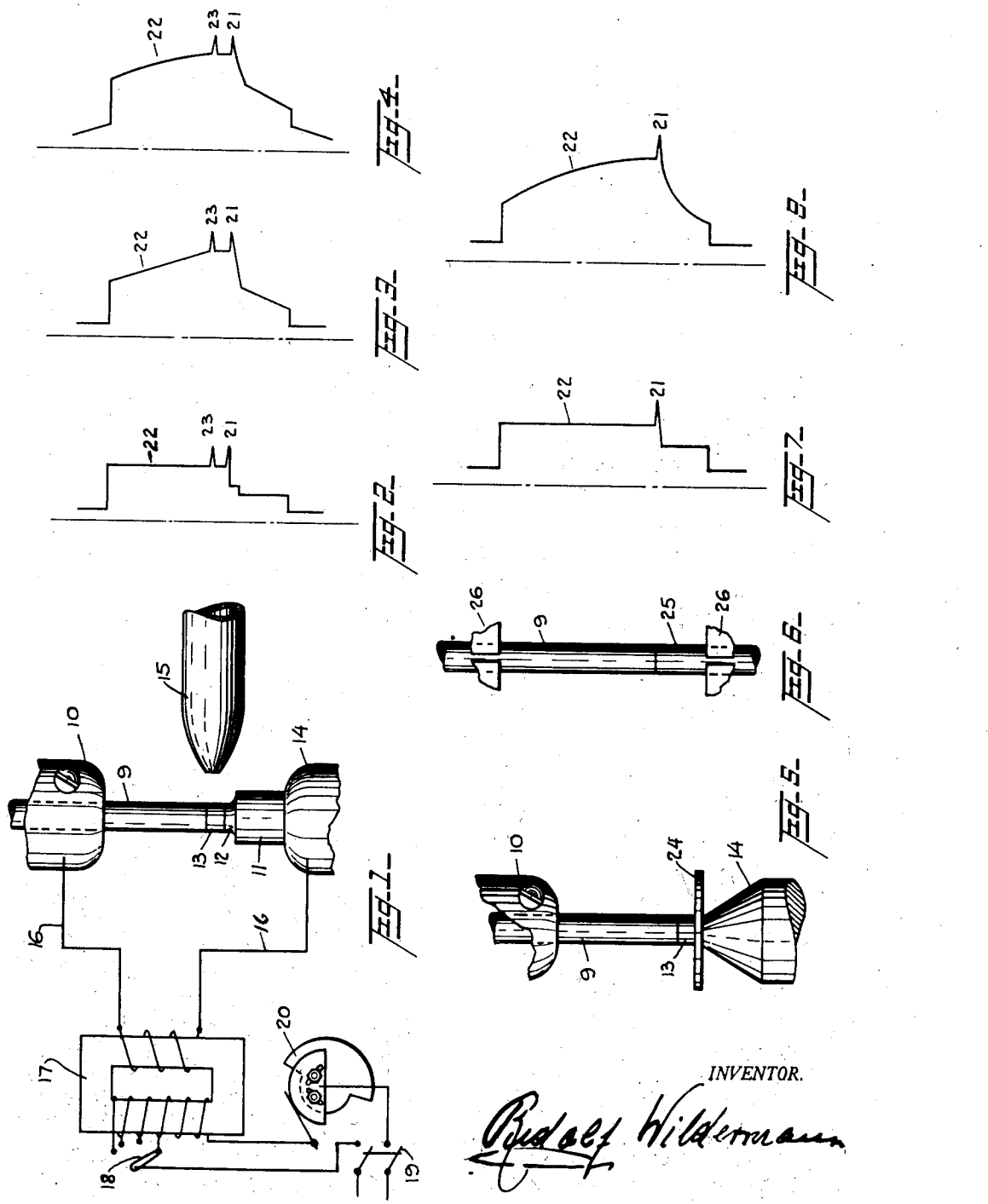
INVENTOR.
Rudolf Wildermann

UNITED STATES PATENT OFFICE 1,990,314

WELDING REFRACTORY METAL

Rudolf Wildermann, New York, N. Y.

Application May 31, 1930, Serial No. 458,506

1 Claim. (Cl. 219—10)

My invention relates to the art of welding refractory metals,—i. e. metals with a melting point above that of platinum,—among themselves or to other metals.

Heretofore only indirect methods have been in use for this kind of work. The method most commonly applied,—and frequently wrongly denominated "welding",—has been brazing, in the process of which copper, nickel, cadmium, silver, brass and other elements and alloys of similar metallic characteristics serve as solders to bring about a union between the metals. Electric resistance welding processes have also been developed, but by these methods a direct, integral weld could not be attained without destroying by fusion the shape of the parts or of one of the parts to be welded together; hence auxiliary means were introduced to increase the heat at the welding point. For instance, Alfred J. Liebmann and William A. Megrath disclosed in their Patent No. 1,155,426 of October 5th, 1915 a method of welding tungsten to steel or similar metals wherein they introduced exothermic compounds, particles of tungsten, or both between the faces to be welded together. The use of exothermic compounds would, of course, entail the presence of foreign matter in the completed weld, whereas the use of tungsten particles would bring about a weld at the points where they were interposed, but imperfect welds or even oxidized spots, which were not welded at all, between these points; in all cases the weld was heterogeneous. Hence this method of welding tungsten was subsequently abandoned.

By my invention I have overcome the use of any auxiliary compounds between the metals to be united. Thus I attain the object of my invention which is to produce a direct, integral and homogeneous weld between refractory metals or between a refractory metal and another metal, without essentially changing the shape of the metals to be united.

The method I use is an electric resistance welding process. I succeed in building up the desired temperature at the welding point by preventing the conductive dissipation of the heat.

The arrangements I use for, and the principles of, my invention I shall explain by means of the drawing, in which—

Figure 1 shows the head and an incidental wiring diagram of a spotwelder arranged for my welding process.

Figures 2, 3 and 4 show electric resistance diagrams of the arrangement in Figure 1, before and during operation.

Figure 5 shows another spot-welding arrangement.

Figure 6 shows a butt-welding application, Figures 7 and 8 are the corresponding electric resistance diagrams, before and during operation.

Similar numerals refer to similar parts throughout the different figures.

In Figure 1 the upper welding electrode consists of a refractory rod 9 slidably mounted in the top part 10 of the head. The piece 11, onto the shank 12 of which the piece of refractory metal 13 is to be welded, rests on or in the lower part 14 of the welding head. A nozzle 15, connected to a source of reducing gas, like hydrogen, or a source of an inert gas, like argon, faces the point at which rod 9 touches piece 13 and may be brought into play to prevent oxidation of these metals under continuous operation. The welding head is connected to the secondary of transformer 17 by connectors 16. The potential available at the secondary of the transformer is about twice that ordinarily used in resistance welding circuits. A control switch 18 tapped in at various points of the primary coil on the transformer serves for potential regulation; in addition to the main switch 19 the primary also includes an automatic timing switch 20. This, and the other welding heads shown in my drawing, are operated as customary in the art of resistance welding: The upper and the lower part of the welding head are brought together by hand, foot or mechanical power and the welding current is automatically closed when the desired pressure is applied to the pieces to be welded. The period of application of the welding current may be controlled by the operator, I do however prefer the use of a variable timer, by means of which the actual welding time may be regulated to a fraction of a second.

In the diagrams of Figures 2, 3 and 4, and 7 and 8, the lineal dimensions of the respective welding heads, as projected over from those views, are entered as ordinates, the electric resistances are roughly plotted as abscissæ. The resistances at the welding points 21 should be shown, at least before the operation, as straight lines whereas in the figures a small volume is given to them along the abscissa. 22 indicates the resistance along the refractory metal rod. In the spotwelding operation there is a second point of maximum resistance, 23, where the refractory metal rod touches the refractory metal piece. The thermal resistance, ordinarily closely related to the electric resistance, is, along the path of the metals in the welding heads, proportionated similar to the electric resistance.

In Figure 5 the refractory metal piece 13 is welded to a piece of sheet metal 24; in this case the lower electrode has been given the regular pointed shape of copper or alloy electrodes as used for spotwelding. The welding heads may of course in all cases be water-cooled, as customary, to prevent the dissipation of the welding heat throughout the whole conductor.

In certain instances nichrome or similar heat-proof alloys may be used as substitutes for the refractory metal part of the upper electrode; in general I prefer to use for that part a metal of higher melting point than that of piece 13, which is to be welded. If the latter piece is tungsten, I use tungsten for the electrode, no other metal of higher melting point being available. Carbon, aside from its lack of physical strength, is not practical for this purpose because it has the tendency of forming carbides when in touch with the refractory metals at such high temperatures.

Figure 6 shows the use of my invention for the process of butt-welding. In this case the refractory metal 9 is the part to be welded to another metal rod 25. Both of these parts are held in the clamping jaws 26 which form part of the head of the butt-welding apparatus.

I shall in the following description use tungsten as the refractory metal most representative on account of its highest melting point. These details can of course be carried through with any other refractory metal.

Tungsten has been welded to the metals with melting points above or at that of steel by the various methods of brazing and indirect welding outlined in the beginning of this specification. None of those methods, nor any other methods known previous to my invention, could be successfully applied to the welding of tungsten to metals with melting-points below that of steel, unless it was cast right into them. Yet it is highly desirable for many branches of our industries to be able to integrally join tungsten to finished brass or bronze parts. With my invention I can weld tungsten directly and integrally to such metals, as well as to tempered steel parts, without changing the shape or the physical characteristics of such metals. I accomplish it because my process offers a perfect and thoroughly flexible control of the welding heat in respect to temperature as well as in regard to localization of the heat. The simplicity of my method makes it very valuable for quantity production. It can be readily adapted for fully automatic production methods which, to date, could not be accomplished with the brazing or indirect welding processes.

To regulate the heat so as to bring the temperature of the refractory metal piece 13, at the point where it is to be welded, near to the fusion point, whereas part 14, with its much lower melting point, must be kept below such a temperature and may be heated to the point of fusion only at the point of contact with piece 13, I change the distance to which part 9 protrudes from the head 10, until such a heat distribution is approximately reached and then I obtain a final regulation by adjusting the time of application and the potential of the welding current.

The cold resistance of the welding head in Figure 1 is approximately like the resistivity curve shown in Figure 2. If the secondary coil of the transformer furnishes the current at four times the normal potential the welding current is correspondingly increased. Applying this current for a very small fraction of a second,—about 1/25th of one second was used in the experiment,—the weld is completed, before the resistivity curve materially deviates from the one outlined in Figure 2. Whereas this method of "forced welding" may be used where the cold resistance relations of specific problems are desirable for the proper heat at the welding point, the heavy welding current, applied for such a short period of time will be more easily affected by small resistance variations which are due to slight dirt, corrosions or mechanical imperfections at the points of contact and which cannot be avoided altogether. Hence I shall normally use less current and allow more time for the actual welding; then the welding will proceed while the parts are heating up and while the electric resistivity changes successively to the curves of Figures 3 and 4. Under these conditions a reserve heat is created in the rod 9, which not only prevents the dissipation of the heat from the welding point in that direction,—due to the increased thermal resistance of part 9,—but which also supplies a flow of additional heat to the welding point. This reserve heat is a function of the normal electric and thermal resistivity of the material as well as of the length and of the diameter or the diameters or the cross-sections and contours at various points of the length of part 9 and it can be fully controlled by the choice of material and of the shape of that part 9. I shall provide for more resistance in and for more reserve heat from that part 9 if part 11 has a low melting point or if that part is shaped to rapidly dissipate the heat, as conditions of Figure 5 would suggest. Part 9 being shown in the drawing simply as a straight round rod, it protrudes further from part 10 of the head in Figure 5 than in Figure 1, and it will therefore accumulate more heat if the same welding current,—but necessarily under a higher potential,—as used for the arrangement of Figure 1, is applied. Welding does not take place between 9 and 13. This is accounted for by the higher melting point of the metals touching there, more cooling by the surrounding atmosphere or gas and a light oxidation of the end of the electrode.

Still, I can easily weld refractory metals among themselves, as well as to other metals, by the arrangement of Figure 6; of course any shape of metal may take the place of 25 which does not necessarily have to be clamped in position but may otherwise be arranged in contact with the electrode. Applying my invention to this arrangement, I use twice or more times the usual resistance welding potential across the head and have the refractory metal rod protrude to obtain a zone near the point of welding, which holds reserve heat for the welding and which prevents the dissipation of the welding heat in that direction.

If two refractory metals are to be welded together they are both arranged to have zones of reserve heat near the point of welding, the respective resistances being approximately proportionate to the respective melting points. From resistance curves similar to the cold and hot resistance diagrams of Figures 7 and 8, the proper proportions for heat zone, welding potential and welding time may be derived.

I do not use any flux, coating, points of protrusion, or other means or agents at the point of welding. If the material used at the heating zone near to but not at the point of welding is subject to oxidation under continuous use, I may retard such oxidation by a protective sleeve of refractory material or by providing an inert or reducing gas zone, as described before.

An integral welding of metals, under the peculiar conditions concerned in this application, may possibly be made by the ordinary welding procedure, if a very much greater amount of instantaneous heat is supplied, a greater current at a greater voltage being used. But, such welding is extremely difficult to control. The slightest variations of the resistances, for instance at the point where the electrodes contact with the parts to be welded, will produce a poor weld, either one of the parts will burn, or the parts are not welded. Such difficulties are overcome by my invention. The intensity of the welding current is not increased and no delicate adjustment of the timing of the weld is therefore necessary.

The increased quality of the weld and the simplification of the control greatly offset the wattage lost in heating the thermal resistance which is connected into my welding circuit at a position close to the welding point.

My method of supplying increased heat on one side of the resistance weld to be made, or of preventing the diffusion of heat near the weld, by interposing a heated conductor section near the weld, is not limited to applications where one of the parts to be welded requires a higher heat than the other for the purpose of fusion. It may also be applied to cases where parts of similar melting points are to be welded together, but where the greater thermal conductivity of one of said parts or its cross-section would prevent that part from reaching the required heat as quickly as the other part, because of the fast dissipation of the heat created in said part at the welding point. For instance if the piece of sheet metal 24 and the disc 13 of Figure 5 have substantially the same properties, I reverse their positions during the welding process so that the rotation of parts in the welding circuits is 10, 9, 24, 13, 14. By the ordinary welding methods part 13 would come to heat very much faster than part 24 on account of its smaller cross section. But, by arranging the parts in the above manner, the plate 24 is heated not only by the currents passing therethrough and by the heat dissipated thereinto from the disc 13, but its temperature is also increased by the heat diffused thereinto from the refractory metal rod 9; thus both of the parts which are welded together are brought up to heat simultaneously and a perfect weld is obtained. A simple practical application of this principle would be for instance the welding of pins to a bayonet lamp base. In such an application one electric terminal connects to the pin-wire; but the other electric terminal does not connect directly to the inside or outside of the cylindrical base, but a refractory metal rod protruding from the second electric terminal is arranged in alignment with the pin-wire and the cylindrical base is clamped between the end of said refractory metal rod and the pin-wire during the welding operation. The refractory metal rod will come to heat during the welding operation and will heat the point of the lamp base, at which the pin is to be welded thereto, by conduction from the inside and that rod will at the same time prevent the dissipation of heat from the shell of the bayonet base to the conductor.

I claim:

The method of welding together two parts,—the first of which requires more welding heat than the other, between the electrodes of a resistance welder circuit, comprising interposing in series with said circuit between said first part and the respective electrode a metallic resistor adapted to be raised to substantially red heat by the current required for welding said parts, and applying to said electrodes a current at a potential sufficient to pass said welding current through said parts and said resistor, thus causing a homogeneous weld between said parts.

RUDOLF WILDERMANN.